United States Patent
Tanaka et al.

[11] Patent Number: 5,364,682
[45] Date of Patent: Nov. 15, 1994

[54] COMPOSITE SLIDING MEMBER WITH IMPREGNATED MESH LAYER

[75] Inventors: Tadashi Tanaka, Konan; Hidehiko Tamura, Aichi; Nobutaka Hiramatsu, Ichinomiya; Takuya Tanaka, Nagoya, all of Japan

[73] Assignee: Daido Metal Company Ltd., Nagoya, Japan

[21] Appl. No.: 5,131

[22] Filed: Jan. 15, 1993

[30] Foreign Application Priority Data

Jan. 17, 1992 [JP] Japan .................. 4-006396

[51] Int. Cl.$^5$ .................. C10M 111/04; B32B 3/24
[52] U.S. Cl. .................. 428/138; 428/553; 428/546; 428/549; 428/550; 428/551; 428/560; 428/564; 428/596; 428/137; 428/135; 428/141; 428/256; 428/463; 428/421; 428/422; 428/325; 428/323; 428/328; 428/327; 252/12.2; 384/913; 384/912; 384/908
[58] Field of Search .............. 428/553, 546, 549, 550, 428/551, 560, 564, 596, 138, 137, 135, 141, 256, 463, 421, 422, 325, 323, 328, 327; 252/12.2; 384/913, 912, 908

[56] References Cited

U.S. PATENT DOCUMENTS

| | | | |
|---|---|---|---|
| 4,156,049 | 5/1979 | Hodes et al. | 428/409 |
| 4,439,484 | 3/1984 | Mori | 428/318.4 |
| 4,626,365 | 12/1986 | Mori | 252/12.2 |
| 4,732,818 | 3/1988 | Pratt et al. | 428/547 |
| 4,812,367 | 3/1989 | Bickle | 428/332 |
| 5,091,098 | 2/1992 | Tanaka et al. | 252/12.2 |
| 5,162,157 | 11/1992 | Tanaka et al. | 428/549 |

FOREIGN PATENT DOCUMENTS 3250096 11/1991 Japan .
3250097 11/1991 Japan .
4505335 9/1992 Japan .

Primary Examiner—William P. Watkins, III
Attorney, Agent, or Firm—Browdy and Neimark

[57] ABSTRACT

A composite sliding member includes a metal wire mesh or expanded metal impregnated and covered with a composition of 0.1–50% by volume of one or more of PFA, FEP and EPE, and 0.1–50% by volume of at least one of oxybenzoyl polyester, polyphenylene sulfide, thermosetting resin, metal lubricant, metal oxide, composite metal oxide, metal sulfide, metal fluoride, carbon-based self lubricant, fiber material, and ceramics, with the remainder being substantially PTFE.

5 Claims, 3 Drawing Sheets

COMPOSITE SLIDING MEMBER WITH IMPREGNATED MESH LAYER

BACKGROUND OF THE INVENTION

1. Field of the Invention

The present invention relates to a composite sliding member excellent in draw forming characteristics and wear resistance.

2. Description of the Related Art

Conventionally, composite sliding members used as a bearing member and the like are composed of metal wire mesh or expanded metal as a base having a void portion and surface covered and impregnated with a sliding member composition or a synthetic resin composition obtained from tetrafluoroethylene resin (hereinafter, referred to as PTFE) together with a filler such as graphite, molybdenum disulfide, glass fiber, thermosetting resin and the like. These composite sliding members have as an object, obtaining a good wear resistance and low friction coefficient.

The composite sliding member formed of the aforesaid metal wire mesh or expanded metal covered and impregnated with the sliding member composition has achieved a fairly low friction coefficient and low wear amount. Nevertheless, under severe circumstances in which these composite sliding members have recently been used is taken into consideration, they do not always satisfy sliding property, in particular, wear resistance. Further, bearings having various shapes are difficult to produce from such composite sliding members by draw forming and the like.

This is because the PTFE resin used has a poor adhesion force with the base and when formed, crack or exfoliation is created between the PTFE resin and the base and thus the mechanical strength of the resulting sliding member is greatly lowered. Further, the PTFE resin also has a poor adhesion force with the filler and thus the sliding property is also lowered because the filler becomes lost.

An object of the present invention is to solve the aforesaid problems and provide a composite sliding member excellent in draw forming and sliding property, and in particular in wear resistance.

SUMMARY OF THE INVENTION

To achieve the above object, the present invention provides a composite sliding member having excellent draw forming characteristics and wear resistance. More specifically, according to the present invention, there is provided a composite sliding member, which comprises a base composed of a metal wire mesh or expanded metal having a void portion and surface covered and impregnated with a lubricating composition comprising 0.1–50% by volume of at least one kind of resin selected from a group (A) consisting of tetrafluoroethylene-perfluoroalkylvinylether copolymer resin (hereinafter, referred to as PFA), tetrafluoroethylene-hexafluoropropylene copolymer resin (hereinafter, referred to as FEP), and fluoroethylene-propyleneether resin (hereinafter, referred to as EPE), 0.1–50% by volume of at least one kind selected from a group (B) consisting of oxybenzoyl polyester, polyphenylene sulfide, thermosetting resin, metal lubricant, metal oxide, composite metal oxide, metal sulfide, metal fluoride, carbon-based self lubricant, fiber material and ceramics, and the remaining of substantially tetrafluoroethylene resin, wherein the total of the components other than the tetrafluoroethylene resin is 0.2–70% by volume.

Figure 1:
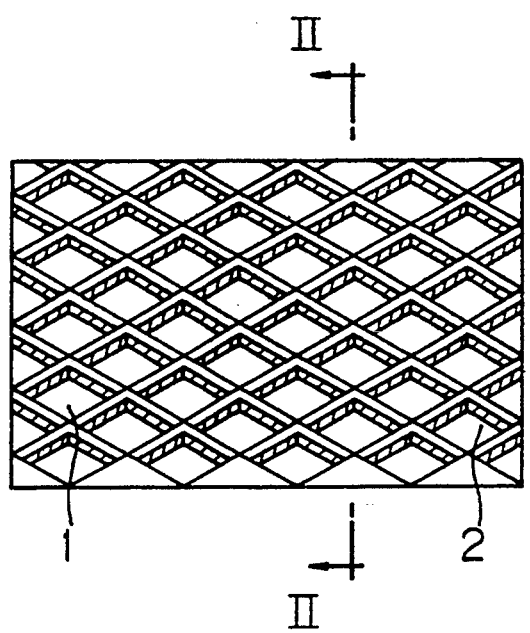
FIG. 1 is a plan view of an expanded metal constituting a base.

Reference Numerals in figures are as follows:
1 void portion
2 strand
3 thin metal wire
4 resin component

DESCRIPTION OF PREFERRED EMBODIMENTS

A metal wire mesh serving as a base in the present invention is composed of, for example, a thin wire of phosphor bronze alloy, aluminum alloy, stainless steel alloy and the like having a wire diameter of 0.05–2 mm and knitted to 10–200 meshes.

Further, expanded metal is composed of, for example, a thin plate of phosphor bronze alloy, aluminum alloy, stainless steel alloy and the like having a thickness of 0.05–2 mm and subjected to an expansion processing to provide it with each side of 0.1–3 mm and a thickness of 0.1–4 mm.

Next, fluoro resin includes all the combinations of PTFE and one or more selected from a group (A) consisting of PFA, FEP and EPE, i.e., all the combinations of PTFE-PFA, PTEF-EPE, PTFE-FEP, PTFE-PFA-EPE, PTFE-PFA-FEP, PTFE-EPE-FEP, and PTFE-PFA-EPE-FEP can be used as fluoro resin. These components are mutually soluted with one another during the sintering step and made into a uniform material having characteristics completly different from those of the original PFA, FEP, EPE or PTFE and a simple mixture thereof.

As described above, the adhesion force of the PTFE resin with the base is greatly improved in such a manner that the PTFE is kneaded with at least one kind of resin selected from the group (A) and sintering to make it a crack and exfoliation-resistant homogeneous material, and thus cracking, exfoliation and the like can be prevented during draw forming. Further, the adhesion force of PTFE with the filler is also improved and the effect of the wear resistance of the filler is encouraged by preventing the removal of the filler. The composition of the present invention does not constitute simple blended polymers.

More specifically, the respective combinations of PTFE, PFA, FEP and EPE exhibit the respective melting points (m.p.) thereof before they are sintered. When, however, the combinations having been sintered once are examined through an analysis effected by using an optical microscope and differential scanning calorimeter (DSC), it is found that the components in the aforesaid respective combinations are mutually soluted among one another and made to an uniform structure without any boundary between the respective components.

Note, the reason why the components constituting the group (A) are specified to PFA, FEP and EPE is based on the finding that when a sliding member is formed by using other fluoro resins such as, for example, ETFE, PVDF, PCTFE and the like or combinations thereof, an eminent deformation such as decomposition, cracking, swelling and the like is caused during the sintering step and the mechanical strength of the sliding member is greatly lowered.

The amount to be used of the components of the group (A) is 0.1–50% by volume and preferably 2–30% by volume based on the total volume, because when it is less than 0.1% by volume, friction property and wear resistance which are an object of the present invention are greatly lowered, and when it is greater than 50% by volume, although wear resistance is improved, the friction coefficient and frictional temperature are increased to lower the sliding property.

Next, selected as components constituting group (B) is one kind or a combination of two or more kinds of oxybenzoyl polyester, polyphenylene sulfide, thermosetting resin, metal lubricant, metal oxide, composite metal oxide, metal sulfide, metal fluoride, carbon-based self lubricant, fiber material and ceramics, and an amount to be used thereof is 0.1–50% by volume and preferably 2–30% by volume of a total amount. When it is less than 0.1% by volume, the addition of the components produces no effect on wear resistance and it is meaningless. When it is greater than 50% by volume, although a wear resistance is improved, friction coefficient and frictional temperature are increased to lower sliding property.

Note, the above thermosetting resin includes resin composed of polyimide, polyamideimide, silicone resin, phenolic resin and the like to which eminent deformation such as decomposition, cracking, swelling and the like is not caused during the sintering step.

Further, the metal lubricant includes Pb, Sn, Cu, Zn, Bi, Cd, In, Li, and/or alloys thereof; the metal oxide includes the respective oxides of Zn, Al, Sb, Y, In, Zr, Mo, Cd, Ca, Ag, Cr, Co, Ti, Si, Mn, Sn, Ce, W, Bi, Ta, Fe, Cu, Pb, Ni, Te, Nb, Pt, V, Pd, Mg and Li; the composite metal oxide includes $CoO—Al_2O_3$, $TiO_2—ZnO_2$, $PbO—TiO_2$, $CoO—SnO_2$, $MgO—Al_2O_3$, $ZrO_2—SiO_2$, $CoO—Al_2O_3—MgO$, $CoO—Al_2O_3—Cr_2O_3$, $CoO—ZnO—MgO$, $Pb_3O_4—Sb_2O_3—TiO_2$, $Cr_2O_3—Sb_2O_3—TiO_2$, $Cr_2O_3—CuO—MnO_2$, $CoO—Cr_2O_3—Fe_2O_3$, $CoO—ZnO_2—NiO_2—TiO_2$, $CoO—Cr_2O_3—MnO_2—Fe_2O_3$ and the like; the metal sulfide includes $MoS_2$, $WS_2$ and the like; the metal fluoride includes $PbF_2$, $AlF_3$, $CdF_2$, $BaF_2$, $CaF_2$ and the like; and the carbon-based self lubricant includes fluorinated graphite, graphite, cokes, pitch, tar, carbon and heat treated phenolic resin and the like.

The fiber material includes natural fibers and synthetic fibers such as carbon fiber, cotton (cellulose), asbestos, rock wool, potassium titanate fiber, aromatic polyamide fiber and the like; and the ceramics includes SiC, TiC, $B_4C$, BN, $Si_3N_4$, AlN, HfN, TaN, WC, TaC, VC, ZrC and the like.

Figure 3:
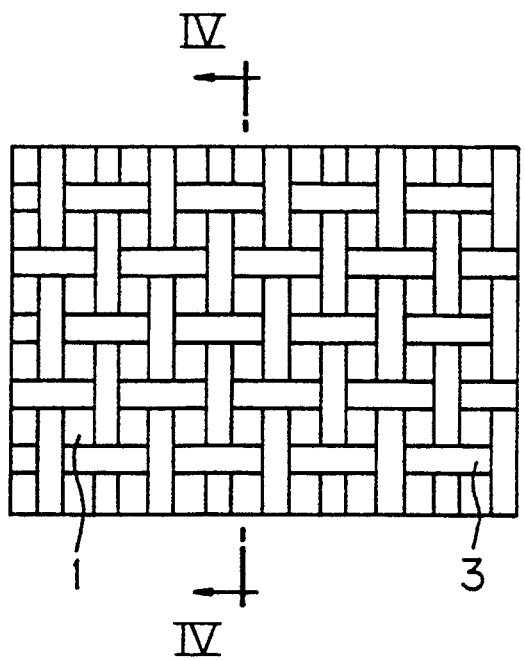
FIG. 3 is a plan view of a metal wire mesh constituting a base.
Figure 4:
FIG. 4 is a cross sectional view taken along the line B—B of FIG. 3.

The invention will be more clearly understood with reference to the following examples:

(1) A phosphor bronze alloy thin wire having a diameter of 0.2 mm was knitted to 40 meshes to form a metal wire mesh serving as a base whose plan view and cross sectional view are shown in FIGS. 3 and 4, respectively. Next, the metal wire mesh was caused to pass between rolls so that the void portion and surface thereof was impregnated and covered with the composition shown in Table 1 and the mesh thus treated was sintered at 380° C. for three minutes.

Further, the metal wire mesh was caused to pass between rolls and made to a uniform thickness of 0.5 mm to thereby obtain conventional products (Nos. 1 and 2) and products according to the present invention (Nos. 6–9).

These products were subject to a friction and wear test and break test. Tables 3 and 4 show the conditions for the tests (which are also applied to the following tests) and Table 1 shows the result of the tests.

Figure 6:
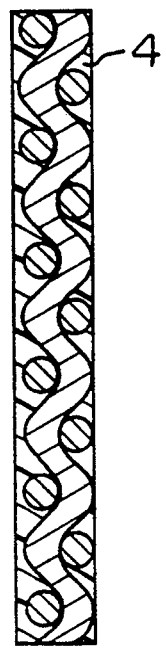
FIG. 6 is a cross sectional view of a composite sliding material according to the present invention using a metal wire mesh as a base.

(2) An aluminum alloy thin wire having a diameter of 0.2 mm was knitted to 40 meshes to form a metal wire mesh serving as a base whose plan view and cross sectional view are shown in FIGS. 3 and 4, respectively. Thereafter, conventional products (Nos. 3 and 4) and products according to the present invention (Nos. 10–13) shown in FIG. 6 were obtained in the same way as item (1).

Table 1 shows the results of the friction and wear test and break test of these products.

(3) A stainless steel alloy thin wire having a diameter of 0.2 mm was knitted to 40 meshes to form a metal wire mesh serving as a base whose plan view and cross sectional view are shown in FIGS. 3 and 4, respectively. Thereafter, conventional products (No. 5) and products according to the present invention (Nos. 14–16) shown in FIG. 6 were obtained in the same way as item (1).

Table 1 shows the results of the friction and wear test and break test of these products.

Figure 2:
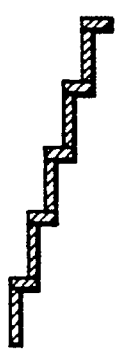
FIG. 2 is a cross sectional view taken along the line A—A of FIG. 1.

(4) A phosphor bronze alloy plate having a thickness of 0.3 mm was subjected to an expansion processing to form a lozenge-shaped expanded metal with each side of 0.8 mm and thickness of 0.4 mm serving as a base whose plan view and cross sectional view are shown in FIGS. 1 and 2, respectively.

Next, the expanded metal was caused to pass between rolls so that the void portion and surface of the expanded metal were impregnated and covered with the components shown in Table 1 and these components were sintered at 380° C. for three minutes. Further, these products were caused to pass between rolls and made to a uniform thickness of 0.5 mm to thereby obtain conventional products (Nos. 17 and 18) and products according to the present invention (Nos. 22–25).

Table 2 shows the results of the friction and wear test and break test of these products.

Figure 5:
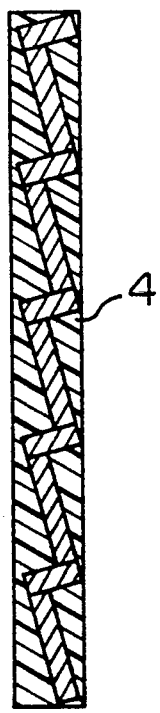
FIG. 5 is a cross sectional view of a composite sliding member according to the present invention using expanded metal as a base.

(5) An aluminum alloy plate having a thickness of 0.3 mm was subjected to an expansion processing to form a lozenge-shaped expanded metal with each side of 0.8 mm and thickness of 0.4 mm serving as a base whose plan view and cross sectional view are shown in FIGS. 1 and 2, respectively. Thereafter, conventional products (Nos. 19 and 20) and products according to the present invention (Nos. 26–29) shown in FIG. 5 were obtained in the same way as item (1).

Table 2 shows the results of the friction and wear test and break test of these products.

(6) A stainless steel alloy plate having a thickness of 0.3 mm was subjected to an expansion processing to form a lozenge-shaped expanded metal with each side of 0.8 mm and thickness of 0.4mm serving as a base whose plan view and cross sectional view are shown in FIGS. 1 and 2, respectively. Thereafter, conventional products (Nos. 21) and products according to the present invention (Nos. 30-32) shown in FIG. 5 were obtained in the same way as item (1).

Table 2 shows the results of the friction and wear test and break test of these products.

As apparent from Tables 1 and 2, when the conventional products (Specimen Nos. 1-5, 17-21) are compared with the products of the present invention (Specimen Nos. 6-16 and 22-32), the products according to the present invention have an improved wear resistance and friction coefficient as described below.

First, with respect to a wear resistance, the amounts of wear of the products according to the present invention are lower than those of the conventional products. This is because that the fluorocarbon resin component is mutually soluted to provide a uniform material having an improved adhesion force with the filler, the removal of the filler is prevented and the wear resistance is encouraged by the filler.

Next, with respect to friction coefficient, as apparent from Tables 1 and 2, the conventional products have the friction coefficients of about 0.11-0.34. As shown in the products Nos. 1, 2, 3, 17, 18, 19 and 21, however, even the products having the friction coefficients as low as about 0.11-0.18 have a large amount of wear and thus are not satisfied as to the wear resistance.

Whereas, the products according to the present invention have the friction coefficients of about 0.09-0.17 which are as low as those of the conventional products as well as the small amounts of wear and also are satisfied as to the wear resistance.

Further, with respect to processability, as apparent from Tables 1 and 2, the products according to the present invention using the metal wire mesh or expanded metal as the base which is impregnated and covered with the aforesaid resin composition have fairly high Erichsen values as compared with those of the conventional products and thus crack and exfoliation are difficult to be caused in these products. This is because that the adhesion force of the base with the fluorocarbon resin is improved in such a manner that at least one kind of resin selected from the group (A) composed of PFA, FEP and EPE is mutually soluted with the PTFE resin to contribute to the prevention of crack and exfoliation and the decrease in a mechanical strength.

As apparent from the above-mentioned, the products according to the present invention have a more excellent draw forming characteristics as compared with that of the conventional products and thus can provide sliding members having various kinds of shapes as well as volume of a sliding member can be reduced because they can be used as a thin material.

TABLE 1

| | No. | Metal Wire Mesh Base | Group (A) | | | Group (B) | | | | | | |
|---|---|---|---|---|---|---|---|---|---|---|---|---|
| | | | PFA | FEP | EPE | Oxybenzoyl Polyester | PPS | Polyimide | Phenolic Resin | Pb | Pb—Sn | PbO |
| Conventional Products | 1 | Phosphor | | | | | | | | | | |
| | 2 | Bronze | | | | | | 10 | | | | |
| | 3 | Aluminium | | | | | | | | | | |
| | 4 | | | | | | | | | | | |
| | 5 | Stainless Steel | | | | | | | | | | 10 |
| Products of the Present Invention | 6 | Phosphor | 20 | | | 15 | | | | | | |
| | 7 | Bronze | 10 | 5 | | | | 10 | | | | |
| | 8 | | | 10 | 10 | | | | 5 | | | |
| | 9 | | | 30 | | | | | | | | |
| | 10 | Aluminium | 10 | | | | | | | | | 20 |
| | 11 | | 5 | | 5 | | | | | | | |
| | 12 | | | | 10 | | | | | 5 | | |
| | 13 | | 1 | 1 | | | | | | | | 10 |
| | 14 | Stainless | 5 | 5 | 5 | | | | | | | 10 |
| | 15 | Steel | | 10 | | | 10 | | | | | |
| | 16 | | 2 | | | | | | | | | 10 |

| | No. | Metal Wire Mesh Base | Group (B) | | | | | PTFE | Wear Amount (μm) | Friction Coefficient | Erichsen Value (mm) |
|---|---|---|---|---|---|---|---|---|---|---|---|
| | | | MoS$_2$ | CF* | GF*$^2$ | Gr*$^3$ | SiC | | | | |
| Conventional Products | 1 | Phosphor | | | | 10 | | Remaining | 20.1 | 0.13 | 2.89 |
| | 2 | Bronze | | | | | | Remaining | 17.9 | 0.12 | 2.67 |
| | 3 | Aluminium | 10 | | | | | Remaining | 17.9 | 0.12 | 2.90 |
| | 4 | | | | 20 | | | Remaining | 14.3 | 0.34 | 2.18 |
| | 5 | Stainless Steel | | | | 10 | | Remaining | 15.2 | 0.19 | 1.99 |
| Products of the Present Invention | 6 | Phosphor | | | 5 | | | Remaining | 7.9 | 0.14 | 3.26 |
| | 7 | Bronze | | | | | | Remaining | 6.8 | 0.09 | 3.47 |
| | 8 | | | 5 | | | | Remaining | 4.4 | 0.12 | 3.13 |
| | 9 | | | | | 10 | | Remaining | 7.1 | 0.13 | 3.22 |
| | 10 | Aluminium | | | | | | Remaining | 2.3 | 0.15 | 2.80 |
| | 11 | | | | 20 | | | Remaining | 1.5 | 0.16 | 3.09 |
| | 12 | | | | | | 5 | Remaining | 2.4 | 0.15 | 3.02 |
| | 13 | | | | | | | Remaining | 5.7 | 0.16 | 2.91 |
| | 14 | Stainless | | | | | | Remaining | 2.2 | 0.16 | 3.06 |
| | 15 | Steel | | 5 | | | | Remaining | 3.8 | 0.14 | 3.29 |
| | 16 | | | | | | | Remaining | 1.9 | 0.16 | 3.00 |

*CF - Carbon Fiber;
*$^2$GF - Glass Fiber;
*$^3$Gr - Graphite

TABLE 2

| | No. | Expanded Base | Group (A) PFA | FEP | EPE | Group (B) Oxybenzoyl Polyester | PPS | Polyimide | Phenolic Resin | Pb | Pb—Sn | PbO | MoS₂ | CF* | GF*² | Gr*³ | SiC | PTFE | Wear Amount (μm) | Friction Coefficient | Erichsen Value (mm) |
|---|---|---|---|---|---|---|---|---|---|---|---|---|---|---|---|---|---|---|---|---|---|
| Conventional Products | 17 | Phosphor Bronze | | | | | | | 10 | | | | | | | 10 | | Remaining | 19.1 | 0.13 | 2.91 |
| | 18 | | | | | | | | | | | | | | | | | Remaining | 15.8 | 0.11 | 2.68 |
| | 19 | Aluminium | | | | | | | | | | | 10 | | | | | Remaining | 17.6 | 0.12 | 2.95 |
| | 20 | | | | | | | | | | | | | | 20 | | | Remaining | 14.7 | 0.31 | 2.23 |
| | 21 | Stainless Steel | | | | | | | | | | 10 | | | | 10 | | Remaining | 12.0 | 0.18 | 2.10 |
| Products of the Present Invention | 22 | Phosphor Bronze | 20 | | | 15 | | | | | | | | | | 5 | | Remaining | 8.1 | 0.15 | 3.36 |
| | 23 | | 10 | 5 | | | | 10 | | | | | | | | | | Remaining | 6.7 | 0.10 | 3.49 |
| | 24 | | | 10 | 10 | | | | 5 | | | | | 5 | | | | Remaining | 4.2 | 0.13 | 3.17 |
| | 25 | | | | 30 | | | | | | | | | | | 10 | | Remaining | 7.2 | 0.13 | 3.22 |
| | 26 | Aluminium | 10 | | | | | | | | | 20 | | | | | | Remaining | 3.0 | 0.14 | 2.84 |
| | 27 | | 5 | | 5 | | | | | | | | | | 20 | | | Remaining | 2.4 | 0.16 | 3.12 |
| | 28 | | | 10 | | | | | | 5 | | | | | | | 5 | Remaining | 2.1 | 0.15 | 3.07 |
| | 29 | | 1 | 1 | | | | | | | | 10 | | | | | | Remaining | 5.9 | 0.16 | 2.93 |
| | 30 | Stainless Steel | 5 | 5 | 5 | | | | | | | 10 | | | | | | Remaining | 2.0 | 0.16 | 3.01 |
| | 31 | | | 10 | | | 10 | | | | | | | 5 | | | | Remaining | 3.6 | 0.14 | 3.30 |
| | 32 | | 2 | | | | | | | | 10 | | | | | | | Remaining | 2.0 | 0.17 | 3.15 |

*CF - Carbon Fiber;
*²GF - Glass Fiber;
*³Gr - Graphite

TABLE 3

| Conditions for Friction and Wear Test | |
|---|---|
| 1. Testing machine | Thrust Type Friction and Wear Tester |
| 2. Size of test piece | 40 mm L × 40 mm W × 1.5 mm T |
| 3. Load (MPa) | 9.8 |
| 4. Test Time (Hrs) | 4.0 |
| 5. Velocity (m/s) | 0.05 |
| 6. Lubricant Oil | No Lubrication |
| 7. Material of Shaft | S55C |
|      Hardness (Hv) | 500–700 |
|      Roughness (Rmax μm) | 0.3 |

TABLE 4

| Conditions for Break Test | | |
|---|---|---|
| Break Test | 1. Testing machine | Erichsen Tester (JIS B 7729) |
| | 2. Size of test piece | 90 mm L × 90 mm W × 0.5 mm T |
| | 3. Punch Thrust Speed | 5 mm/min |
| | 4. Criteria for Determination (Erichsen value) | To determine moving distance of punch from point it is in contact with specimen surface when crack reaches backside of specimen. |

What is claimed is:

1. A composite sliding member, comprising a base composed of a metal wire mesh or expanded metal having a void portion and surface covered and impregnated with a lubricating composition comprising 0.1–50% by volume of at least one kind of resin selected from a group (A) consisting of tetrafluoroethylene-perfluoroalkylvinylether copolymer resin, tetrafluoroethylene-hexafluoropropylene copolymer resin, and fluoroethylene-propyleneether resin, 0.1–50% by volume of at least one kind selected from a group (B) consisting of oxybenzoyl polyester, polyphenylene sulfide, thermosetting resin, metal lubricant, metal oxide, composite metal oxide, metal sulfide, metal fluoride, carbon-based self lubricant, fiber material and ceramics, and the remaining of substantially tetrafluoroethylene resin, wherein the total of the components other than the tetrafluoroethylene resin is 0.2–70% by volume.

2. A composite sliding member according to claim 1, wherein an amount to be used of the components of the group (A) is 2–30% by volume.

3. A composite sliding member according to claim 1, wherein an amount to be used of the components of the group (B) is 2–30% by volume.

4. A composite sliding member, comprising a base composed of a metal wire mesh or expanded metal mesh coated and impregnated with a lubricating composition consisting essentially of
   2–30% by volume of a first component (A) consisting of a member selected from the group consisting of tetrafluoroethylene-perfluoroalkylvinylether copolymer resin, tetrafluoroethylene-hexafluoropropylene copolymer resin, fluoroethylene-propylene ether resin, and mixtures thereof, 2–30% by volume of a second component (B) selected from the group consisting of oxybenzoyl polyester, polyphenylene sulfide, thermosetting resin, metal lubricant, metal oxide, composite metal oxide, metal sulfide, metal fluoride, carbon-based self lubricant, fiber material and ceramics, and the remainder being tetrafluoroethylene resin, said tetrafluoroethylene resin and said component (A) being sintered together to form a mutual solution thereof.

5. A composite sliding member, comprising a base composed of a metal wire mesh or expanded metal mesh coated and impregnated with a lubricating composition consisting essentially of 2–30% by volume of a first component (A) consisting of a member selected from the group consisting of tetrafluoroethylene-perfluoroalkylvinylether copolymer resin, tetrafluoroethylene-hexafluoropropylene copolymer resin, fluoroethylene-propylene ether resin, and mixtures thereof, 2–30% by volume of a second component (B) selected from the group consisting of oxybenzoyl polyester, polyphenylene sulfide, thermosetting resin, metal oxide, composite metal oxide, metal sulfide, metal fluoride, carbon-based self lubricant, fiber material and ceramics, and the remainder being tetrafluoroethylene resin.

* * * * *